United States Patent
Chen et al.

(10) Patent No.: US 9,532,358 B2
(45) Date of Patent: Dec. 27, 2016

(54) RESOURCE ALLOCATION METHOD, RADIO NETWORK CONTROLLER, AND BASE STATION

(71) Applicant: Huawei Technologies Co., Ltd., Shenzhen, Guangdong (CN)

(72) Inventors: Jun Chen, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 286 days.

(21) Appl. No.: 14/335,452

(22) Filed: Jul. 18, 2014

(65) Prior Publication Data
US 2014/0355538 A1    Dec. 4, 2014

Related U.S. Application Data

(63) Continuation of application No. PCT/CN2013/070059, filed on Jan. 5, 2013.

(30) Foreign Application Priority Data

Jan. 20, 2012 (CN) .......................... 2012 1 0019039

(51) Int. Cl.
H04W 72/04    (2009.01)
H04W 8/24     (2009.01)

(52) U.S. Cl.
CPC ............. H04W 72/048 (2013.01); *H04W 8/24* (2013.01)

(58) Field of Classification Search
CPC ............. H04W 72/04; H04W 72/0406; H04W 72/0413; H04W 72/042; H04W 72/048; H04W 8/24; H04L 5/0053
See application file for complete search history.

(56) References Cited

U.S. PATENT DOCUMENTS

2008/0165724 A1    7/2008   Wu et al.
2008/0259863 A1*  10/2008   Zhang .................. H04L 5/0005
                                                            370/329

(Continued)

FOREIGN PATENT DOCUMENTS

CN    1750700 A    3/2006
CN    1889759 A    1/2007

(Continued)

OTHER PUBLICATIONS

Machine Translation of WO 2011/086508.*

(Continued)

*Primary Examiner* — Paul H Masur

(57) ABSTRACT

Embodiments of the present invention disclose a resource allocation method, a radio network controller, and a base station. The method includes: generating resource instruction information according to capability information of the maximum number of a monitored HS-SCCH of a terminal configured in an HSDPA multiflow transmission mode, and sending the resource instruction information to abase station; receiving resource allocation information returned by the base station, where the resource allocation information includes the number of HS-SCCH channels allocated by the base station for the terminal in a serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode.

15 Claims, 5 Drawing Sheets

(56) References Cited

U.S. PATENT DOCUMENTS

| | | | | |
|---|---|---|---|---|
| 2008/0291878 | A1* | 11/2008 | Zhang | H04W 72/1289 370/336 |
| 2009/0028103 | A1 | 1/2009 | Wang et al. | |
| 2009/0116468 | A1* | 5/2009 | Zhang | H04L 5/0007 370/342 |
| 2009/0257387 | A1* | 10/2009 | Gholmieh | H04L 5/0053 370/329 |
| 2010/0014467 | A1 | 1/2010 | Wang et al. | |
| 2010/0172252 | A1* | 7/2010 | Ke | H04W 74/006 370/252 |
| 2011/0244806 | A1* | 10/2011 | Gomes | H04W 24/10 455/67.11 |

FOREIGN PATENT DOCUMENTS

| | | | |
|---|---|---|---|
| CN | 101005343 A | 7/2007 | |
| CN | 101350940 A | 1/2009 | |
| CN | 101795441 A | 8/2010 | |
| CN | WO 2011085608 A1 * | 7/2011 | H04W 8/24 |
| CN | 102325005 A | 1/2012 | |
| EP | 1 895 697 A1 | 3/2008 | |
| EP | 1 901 568 A1 | 3/2008 | |
| EP | 1 916 790 A1 | 4/2008 | |
| EP | 1 953 971 A1 | 8/2008 | |
| WO | WO 2007/004628 A1 | 1/2007 | |

OTHER PUBLICATIONS

Huawei et al., "Considerations on Downlink for Introducing Multiflow Data Transmission", Oct. 10-14, 2011, 3GPP TSG-RAN WG1 Meeting #66bis, R1-112984, pp. 1-2.*
"Dynamic control for multiflow transmission", Huawei, HiSilicon, 3GPP TSG-RAN WG2 #76, Nov. 14-18, 2011, 4 pages.
"Number of HS-SCCH to monitor at UE for 3 and 4-carrier HSDPA", Qualcomm Incorporated, 3GPP TSG-RAN WG1 #59bis, Jan. 18-22, 2010, 3 pages.
"3rd Generation Partnership Project; Technical Specification Group Radio Access Network; Physical layer procedures (FDD)(Release 11)", 3GPP TS 25.214 v11.0.0, Dec. 2011, 106 pages.
"3rd Generation Partnership Project; Technical Specification Group Radio Access Network; High Speed Downlink Packet Access (HSDPA); Overall description; Stage 2 (Release 11)", 3GPP TS 25.308 v11.0.0, Dec. 2011, 69 pages.
"3rd Generation Partnership Project; Technical Specification Group Radio Access Network; UTRAN lub interface Node B Application Part (NBAP) signaling (Release 11)", 3GPP TS 25.433 v11.0.0, Dec. 2011, 1,000 pages.

* cited by examiner

RESOURCE ALLOCATION METHOD, RADIO NETWORK CONTROLLER, AND BASE STATION

CROSS-REFERENCE TO RELATED APPLICATIONS

This application is a continuation of International Application No. PCT/CN2013/070059, filed on Jan. 5, 2013, which claims priority to Chinese Patent Application No. 201210019039.9, filed on Jan. 20, 2012, both of which are hereby incorporated by reference in their entireties.

TECHNICAL FIELD

The present invention relates to a wireless internetwork, and in particular, to a resource allocation method, a radio network controller, and a base station.

BACKGROUND

The universal mobile telecommunications system (Universal Mobile Telecommunications System, UMTS) is one of global 3G standards formulated by the third generation partnership project (the third generation partnership project, 3GPP) of the International Organization for Standardization.

A high speed downlink packet access (High Speed Downlink Packages Access, HSDPA) technology is introduced in Release-5 of the UMTS. The technology is a most important technology for realizing increase of UMTS network downlink data capacity and data service rate, and is proposed in an R5 protocol by the 3GPP for meeting smaller than or equal to demands of asymmetric uplink/downlink data services. Under the premise that a constructed system network structure is not changed, it may greatly increase a user downlink data service rate (a theoretical maximum value may reach 14.4 Mbps).

In the latest UMTS standard evolution, an HSDPA multiflow transmission (HSDPA Multiflow Transmission, HSDPA-MF-Tx) technology is further introduced. A principle of the technology is that when a UE is in a coverage area of multiple cells having the same frequency, a network side may configured it to an MF-Tx state, and in this case, the UE may receive an HSDPA service in two cells at the same time. HSDPA channels include a high speed shared data channel (High Speed Physical Data Share Channel, HS-PDSCH) and a corresponding downlink shared control channel (High Speed Shared Control Channel, HS-SCCH) and a corresponding uplink dedicated physical control channel (High Speed Dedicated Physical Control Channel, HS-DPCCH). The downlink shared control channel (HS-SCCH) bears control information from medium access control-high speed (Medium Access Control-high speed, MAC-hs)/Medium Access Control-enhanced high speed (Medium Access Control-enhanced high speed, MAC-ehs) to a terminal. The control information includes a mobile station identity marker, a hybrid automatic repeat request (Hybrid Automatic ReQuest, H-ARQ)-related parameter, and a transmission format used by an HS-DSCH. The information is sent from a base station to a mobile station or a user (User Equipment, UE) every 2 ms.

However, the prior art has the following problems: Due to a limitation of a processing capability, a UE needs to limit the maximum number of HS-SCCH channels monitored by the UE, and when configuration is performed at a network side, HS-SCCH resource information is allocated by a base station, so that if the UE can receive an HSDPA service at the same time in two or more than two cells covered by different base stations, the number of HS-SCCH channels allocated by the different base stations may exceed a processing capability of the UE, which results in waste of HS-SCCH resource allocation and may incur loss of downlink data transmission.

SUMMARY

Multiple aspects of the present invention provide a resource allocation method, a radio network controller, and a base station, which may ensure that a processing capability of a UE is not exceeded when a base station allocates the number of HS-SCCH channels for a terminal, thereby avoiding waste of HS-SCCH resource allocation and a resulting problem of loss of downlink data transmission.

In one aspect of the present invention, a resource allocation method is provided and the method includes:

generating resource instruction information according to capability information of the maximum number of a monitored HS-SCCH of a terminal configured in an HSDPA multiflow transmission mode, and sending the resource instruction information to a base station, where the resource instruction information is used to instruct the base station to allocate an HS-SCCH for the terminal in a serving cell corresponding to the base station; and receiving resource allocation information returned by the base station, where the resource allocation information includes the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode.

In another aspect of the present invention, a resource allocation method is further provided and the method includes:

receiving resource instruction information sent by a radio network controller, where the resource capability instruction information is information generated by the radio network controller according to capability information of the maximum number of a monitored HS-SCCH of a terminal configured in an HSDPA multiflow transmission mode and is used to instruct a base station to allocate an HS-SCCH for the terminal in a serving cell corresponding to the base station;

generating resource allocation information according to the resource instruction information, where the resource allocation information includes the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode; and sending the resource allocation information to the radio network controller.

In another aspect of the present invention, a radio network controller is further provided and the radio network controller includes:

an instruction information generating unit, configured to generate resource instruction information according to capability information of the maximum number of a monitored HS-SCCH of a terminal configured in an HSDPA multiflow transmission mode, where the resource instruction information is used to instruct the base station to allocate an HS-SCCH for the terminal in a serving cell corresponding to the base station;

an instruction information sending unit, configured to send the resource instruction information to the base station; and an allocation information receiving unit, configured to receive resource allocation information that is returned by the base station according to the resource instruction information, where the resource allocation information includes the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode.

In another aspect of the present invention, a base station is further provided and the base station includes:

an instruction information receiving unit, configured to receive resource instruction information sent by a radio network controller, where the resource capability instruction information is information generated by the radio network controller according to capability information of the maximum number of a monitored HS-SCCH of a terminal configured in an HSDPA multiflow transmission mode and is used to instruct the base station to allocate an HS-SCCH for the terminal in a serving cell corresponding to the base station;

an allocation information generating unit, configured to generate resource allocation information according to the resource instruction information, where the resource allocation information includes the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode; and an allocation information sending unit, configured to send the resource allocation information to the radio network controller, so that the radio network controller interacts with the terminal according to the resource allocation information, so as to complete resource configuration.

In another aspect of the present invention, a terminal is further provided and includes:

a configuration information receiving unit, configured to receive resource configuration information sent by a radio network controller, where the resource configuration information is resource configuration information generated according to resource allocation information after receiving the resource allocation information returned by a base station after the radio network controller generates resource instruction information according to capability information of the maximum number of a monitored HS-SCCH of the terminal configured in an HSDPA multiflow transmission mode and sends the resource instruction information to the base station, the resource allocation information includes the number of HS-SCCH channels allocated by the base station for the terminal in a serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode; and a configuration response sending unit, configured to perform configuration according to the received resource configuration information and return resource configuration response information to the radio network controller, so as to complete resource configuration.

In another aspect of the present invention, a radio network system is further provided and includes a radio network controller and a base station. The radio network controller is configured to generate resource instruction information according to capability information of the maximum number of a monitored HS-SCCH of a terminal configured in an HSDPA multiflow transmission mode; send the resource instruction information to the base station; and receive resource allocation information that is returned by the base station according to the resource instruction information, where the resource allocation information includes the number of HS-SCCH channels allocated by the base station for the terminal in a serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode.

The base station is configured to receive the resource instruction information sent by the radio network controller; generate the resource allocation information according to the resource instruction information; and send the resource allocation information to the radio network controller.

According to the technical solutions described in the foregoing, a radio network controller instructs a base station to perform HS-SCCH allocation in a multiflow transmission mode, which may ensure that the total number of HS-SCCH channels allocated by the base station for a terminal does not exceed a processing capability of the terminal, thereby avoiding waste of HS-SCCH resource allocation and a resulting problem of loss of downlink data transmission.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description show only some embodiments of the present invention, and a person of ordinary skill in the art may also obtain other drawings according to these accompanying drawings without creative efforts.

DETAILED DESCRIPTION

Figure 1:
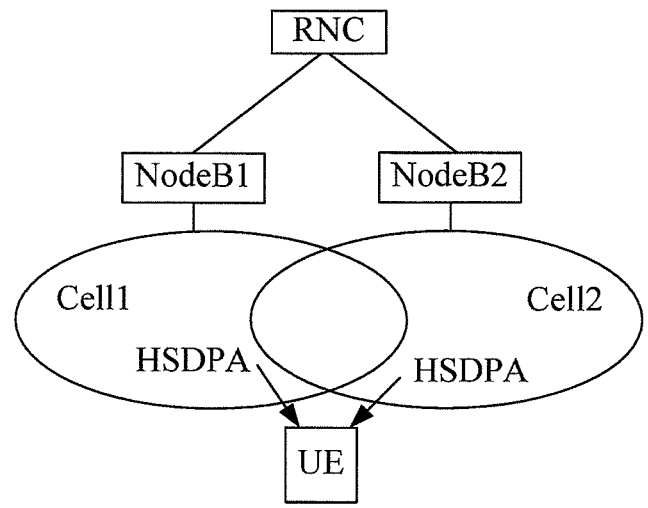
FIG. 1 is a schematic diagram of a network coverage case according to an embodiment of the present invention.

The technical solutions in the embodiments of the present invention are clearly and completely described in the following with reference to the accompanying drawings in the embodiments of the present invention. Apparently, the embodiments to be described are only a part rather than all of the embodiments of the present invention. All other embodiments obtained by a person of ordinary skill in the art based on the embodiments of the present invention without creative efforts shall fall within the protection scope of the present invention.

A technology described in the specification may be used in various communications systems, for example, current 2G and 3G communications systems and a next generation communications system, for example, a global system for mobile communications (GSM, Global System for Mobile communications), a code division multiple access (CDMA, Code Division Multiple Access) system, a time division multiple access (TDMA, Time Division Multiple Access) system, wideband code division multiple access (WCDMA, Wideband Code Division Multiple Access Wireless), a frequency division multiple access (FDMA, Frequency Division Multiple Addressing) system, an orthogonal frequency-division multiple access (OFDMA, Orthogonal Frequency-Division Multiple Access) system, a single carrier FDMA (SC-FDMA) system, a general packet radio service (GPRS, General Packet Radio Service) system, and other communications systems of this kind.

Various aspects are described in the specification with reference to a terminal and/or a base station and/or a base station controller.

A user device may be a wireless terminal, and may also be a wired terminal. The wireless terminal may refer to a device providing voice and/or data connectivity for a user, a handheld device having a wireless connection function, or another processing device connected to a wireless modem. The wireless terminal may communicate with one or more core networks through a radio access network (for example, RAN, Radio Access Network). The wireless terminal may be a mobile terminal, for example, a mobile phone (or called "cellular" phone) and a computer having a mobile terminal, for example, may be a portable, pocket, or handheld mobile apparatus, or a mobile apparatus built in a computer or carried on a vehicle, and they exchange language and/or data with the radio access network, for example, devices such as a personal communication service (PCS, Personal Communication Service) phone, a cordless phone, an session initiation protocol (SIP) phone, a wireless local loop (WLL, Wireless Local Loop) station, and a personal digital assistant (PDA, Personal Digital Assistant). The wireless terminal may also be called as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (for example, an access point) may refer to a device communicating with a wireless terminal through one or more sectors on an air interface in an access network. The base station may be used to perform conversion between a received air frame and an IP packet, and act as a router between the wireless terminal and the rest part of the access network. The rest part of the access network may include an Internet protocol (IP) network. The base station may further coordinate attribute management of an air interface. For example, the base station may be a base station (BTS, Base Transceiver Station) in a GSM or CDMA, and may also be a base station (base station) in WCDMA, which is not limited in the present invention.

The base station controller may be a base station controller (BSC, base station controller) in a GSM or CDMA, and may also be a radio network controller (RNC, Radio Network Controller) in WCDMA, which is not limited in the present invention.

In addition, the terms "system" and "network" in the specification are frequently used in the specification in an interchangeable manner. The term "and/or" in the specification is only an association relationship describing an associated object, and indicates that three kinds of relationships may exist. For example, A and/or B may indicate three cases: Only A exists, both A and B exist, and only B exists. In addition, the character "/" in the specification generally indicates an "or" relationship between associated objects.

In the embodiments of the present invention, a radio network controller (Radio Network Controller, RNC) notifies a base station according to HS-SCCH reception capability information that is of a terminal under MF-Tx state and is reported by the terminal or defined in a protocol, and then the base station reasonably allocates HS-SCCH resource information of the terminal accordingly, and the resource information includes HS-SCCH code channel information, so as to ensure that a resource allocation result (the number of allocated HS-SCCH channels) is within a processing capability range of the terminal.

The HS-SCCH reception capability information that is of the terminal under MF-Tx and is reported by the terminal or defined in the protocol may be HS-SCCH reception capability information carried by the terminal in RRC signaling sent by the terminal to an RNC or HS-SCCH reception capability information defined in the protocol. If the number of MF-Tx serving cells of a UE is x, it is defined that the UE maximally receives i HS-SCCHs in each serving cell, and it is defined that the UE maximally receives j HS-SCCHs in all serving cells, where j=n*x, and n may be an integer smaller than or equal to 1. For example, i=4 and j=3*x; and when the number of MF-Tx serving cells configured for the UE is 2, the UE maximally receives 4 HS-SCCHs in each serving cell, and maximally receives 6 HS-SCCHs in two cells. Generally, information of i and/or j should be configured at an RNC of a network side, and information of i is configured at a base station.

For example, in a network coverage case shown in FIG. 1, the UE may receive an HSDPA service in two cells (Cell1 and Cell2) whose working frequency points are the same, and meanwhile, Cell1 and Cell2 are cells that belong to a base station 1 and a base station 2 respectively. Therefore, with reference to a configuration situation in the previous paragraph, the network side may be configured as follows: The base station 1 is configured with 3 HS-SCCHs, and the base station 2 is configured with 3 HS-SCCHs; or the base station 1 is configured with 2 HS-SCCHs, and the base station 2 is configured with 4 HS-SCCHs.

Figure 2:
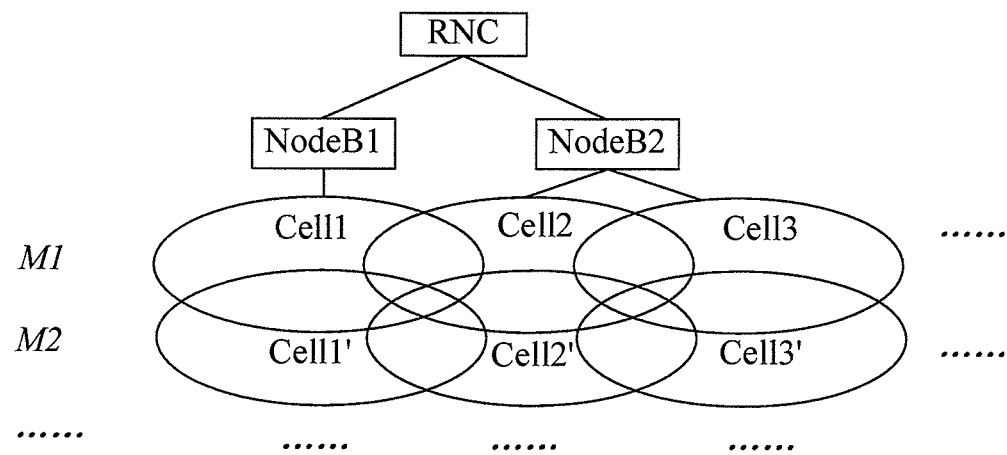
FIG. 2 is a schematic diagram of another network coverage case according to an embodiment of the present invention.

It should be noted that, the example shown in FIG. 1 is only a most basic mode in MF-Tx. The MF-Tx further includes many other modes. For example, as shown in FIG. 2, serving cells are distributed on M frequency points, M>=1, which specifically is M1, M2, M3 . . . , N cells correspondingly exist on each frequency point, N>=1, and specifically, N1 cells exist on M1 frequency points, N2 cells exist on M2 frequency points, and so on.

A specific example of a combination is:

(1) M=1 and N=2 corresponds to two cells on one frequency point, that is, two cells on a frequency point f1. As shown in FIG. 2, a cell 1 and a cell 2 send HSDPA data to a UE at the same time.

(2) M=2, N1=1 and N2=1 corresponds to two cells on two frequency points, that is, one cell on a frequency point f1 and one cell on a frequency point f2. As shown in FIG. 2, a cell 1 and a cell 2' send HSDPA data to a UE at the same time; similarly, it may also be a combination of a cell 2 and a cell 1', a combination of a cell 2 and a cell 3', and so on.

(3) M=2, N1=2 and N2=2 corresponds to four cells on two frequency points, that is, two cells on a frequency point f1 and two cells on a frequency point f2. As shown in FIG. 2, a cell 1, a cell 2, a cell 1', and a cell 2' send HSDPA data to a UE at the same time; similarly, it may also be a combination of a cell 2, a cell 3, a cell 2', and a cell 3', and so on.

Unless otherwise specified, for a specific mode of MF-Tx in the embodiments of the present invention, reference may be made to the foregoing descriptions. The following mainly introduces a specific manner in which resource configuration is performed in an MF-Tx mode.

Figure 3:
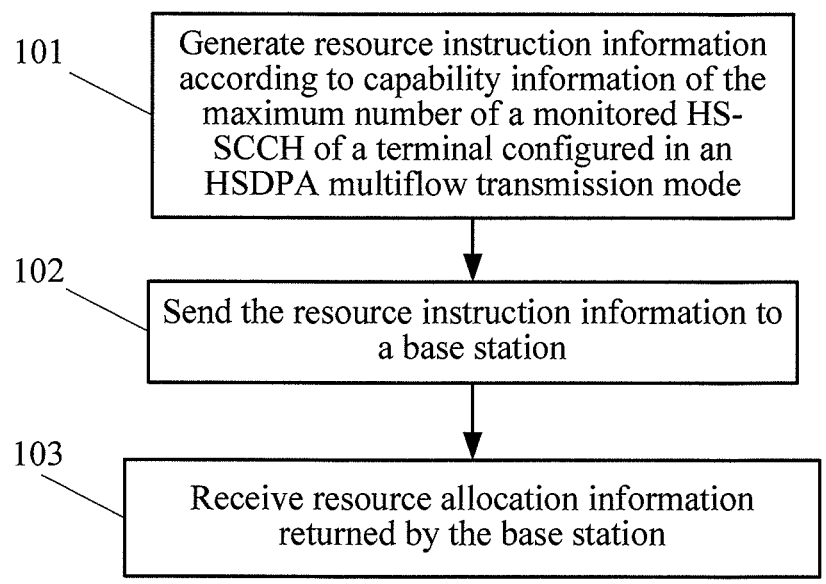
FIG. 3 is a schematic diagram of a specific procedure of a resource allocation method according to an embodiment of the present invention.

As shown in FIG. 3, FIG. 3 is a schematic diagram of a specific procedure of a resource allocation method according to an embodiment of the present invention, and the method includes the following procedure.

101: Generate resource instruction information according to capability information of the maximum number of a monitored HS-SCCH of a terminal configured in an HSDPA multiflow transmission mode, where the resource instruction information is used to instruct a base station to allocate an HS-SCCH for the terminal in a serving cell corresponding to the base station.

The capability information of the maximum number of a monitored HS-SCCH of the terminal configured in the HSDPA multiflow transmission mode may be carried by the terminal in an RRC message sent by the terminal to an RNC or may be defined in a protocol.

Specifically, the capability information of the maximum number of a monitored HS-SCCH of the terminal configured in the HSDPA multiflow transmission mode may include that the terminal maximally receives i HS-SCCHs in the serving cell corresponding to the base station and the terminal maximally receives j HS-SCCHs in all serving cells, and is smaller than or equal to:

$j=n*x$, and $j>=i$;

where x represents the total number of HSDPA multiflow transmission serving cells configured for the terminal, j and i are both integers greater than or equal to 1, and n represents an integer greater than or equal to 1.

Generally speaking, the RNC determines an HSDPA multiflow transmission serving cell through measurement reporting in combination with an algorithm of the RNC, where the measurement reporting is performed by the terminal on a cell. In the embodiment of the present invention, many events may trigger measurement reporting of the terminal, for example, an existing 1A or 1D measurement event. When it is smaller than or equal to a certain condition, the RNC determines to establish a (new) HSDPA multiflow transmission serving cell for the terminal, and in this case, the RNC knows the total number of current serving cells of the terminal and corresponding serving cell (base station) identifiers. Therefore, the RNC may generate corresponding resource instruction information according to this and capability information of the maximum number of a monitored HS-SCCH of the terminal configured in the HSDPA multiflow transmission mode, where the capability information is reported by the terminal or defined in the protocol.

For example, 1: receive an access request message sent by the terminal; 2: determine to establish HSDPA multiflow transmission for the terminal according to the access request message, and determine a base station corresponding to a serving cell establishing the HSDPA multiflow transmission; and 3: obtain the capability information of the maximum number of a monitored HS-SCCH of the terminal configured in the HSDPA multiflow transmission mode, where the capability information is reported by the terminal or defined in the protocol.

102: Send the resource instruction information to the base station. The resource instruction information may be included in control singling sent by the RNC to the base station, for example, a radio link setup request message (RADIO LINK SETUP REQUEST), a radio link addition request message (RADIO LINK ADDITION REQUEST), and a radio link reconfiguration request message (RADIO LINK RECONFIGURATION REQUEST). Alternatively, the resource instruction information may be included in user data sent by the RNC to the base station, for example, FP (Frame Protocol, frame protocol) data.

Two manners of sending the resource instruction information may specifically exist. One is that corresponding resource instruction information is sent to each of multiple base stations without a time sequence limitation. The other is that corresponding resource instruction information is sent to multiple base stations successively in order.

Corresponding to the former case, this step specifically is: send the resource instruction information to the base station, where the resource instruction information includes the maximum number of HS-SCCH channels allocated for the terminal in the serving cell corresponding to the base station, and the maximum number of HS-SCCH channels allocated in the serving cell corresponding to the base station is smaller than or equal to i. Furthermore, when the RNC sends the resource instruction information to multiple base stations, it needs to ensure that a sum of the maximum numbers of HS-SCCH channels allocated in serving cells corresponding to the base stations is smaller than or equal to j, that is, to ensure that a sum of the maximum numbers of HS-SCCH channels allocated for the terminal in all serving cells is smaller than or equal to j.

Corresponding to a latter case, this step specifically is: send resource instruction information to a first base station; obtain resource allocation information returned by the first base station, where the maximum number of HS-SCCH channels allocated in a serving cell corresponding to the first base station in the resource allocation information returned by the first base station is smaller than or equal to i; according to the resource allocation information returned by the first base station and the capability information of the maximum number of a monitored HS-SCCH of the terminal configured in the HSDPA multiflow transmission mode, determine resource instruction information sent to a second base station, where the maximum number of HS-SCCH channels allocated for the terminal in a serving cell corresponding to the second base station in the resource instruction information sent to the second base station is smaller than or equal to i, and a sum of the maximum numbers of allocated HS-SCCH channels corresponding to the terminal in all serving cells is smaller than or equal to j.

That is, the resource instruction information is sent to the base stations successively, and according to the number of HS-SCCH channels that have been allocated in the resource allocation information returned by the previous base station, i, and j, the maximum number of allocated HS-SCCH channels in a serving cell corresponding to a next base station in the resource instruction information sent to the base station is determined, and it is ensured that a sum of the maximum numbers of allocated HS-SCCH channels corresponding to all serving cells of the terminal is smaller than or equal to j. In the case of successively sending the resource instruction information, the resource instruction information sent first is implicit instruction information, that is, a specific limit on the number of channels is not sent, the base station allocates the number of HS-SCCH channels received by the terminal in the corresponding serving cell, and because a value of i is also set on the base station and the value of i is defined in a protocol, it may also be ensured that the number of HS-SCCH channels allocated by the base station meets a requirement.

103: Receive resource allocation information returned by the base station, where the resource allocation information includes the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode.

The resource allocation information may further include related resource information, for example, HS-SCCH code channel information. Meanwhile, the number of HS-SCCH channels allocated by each base station for the terminal in a corresponding serving cell is smaller than or equal to i, and a sum of the numbers of HS-SCCH channels of all serving cell is smaller than or equal to j.

The resource allocation information may be included in control singling sent by the base station to the RNC, for example, a radio link setup response message (RADIO LINK SETUP RESPONSE), a radio link addition response message (RADIO LINK ADDITION RESPONSE), and a radio link reconfiguration response message (RADIO LINK RECONFIGURATION RESPONSE). Alternatively, the resource allocation information may also be included in user data sent by the base station to the RNC, for example, FP (Frame Protocol, frame protocol) data.

Further, after the foregoing step, a configuration process may further be included, that is, resource configuration information is sent to the terminal, where the information includes resource information of an HS-SCCH allocated by the corresponding base station for the terminal in the serving cell, and the resource information includes HS-SCCH code channel information; and a resource configuration response returned by the terminal is received.

The foregoing describes the resource allocation method in the embodiment of the present invention from an RNC side, and the following provides a corresponding description from a base station side.

Figure 4:
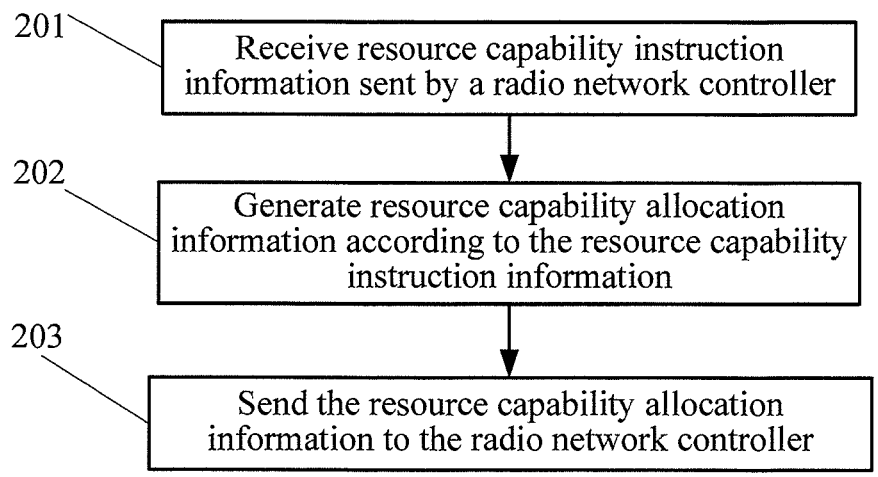
FIG. 4 is a schematic diagram of a specific procedure of a resource allocation method at a base station side according to an embodiment of the present invention.

FIG. 4 is a schematic diagram of a specific procedure of a resource allocation method at a base station side according to an embodiment of the present invention. The procedure includes the following steps.

201: Receive resource instruction information sent by a radio network controller, where the resource capability instruction information is information generated by the radio network controller according to capability information of the maximum number of a monitored HS-SCCH of a terminal configured in an HSDPA multiflow transmission mode and is used to instruct a base station to allocate an HS-SCCH for the terminal in a serving cell corresponding to the base station.

Corresponding to that in the foregoing embodiment, the capability information of the maximum number of a monitored HS-SCCH of the terminal configured in the HSDPA multiflow transmission mode may include that the terminal maximally receives i HS-SCCHs in the serving cell corresponding to the base station and the terminal maximally receives j HS-SCCHs in all serving cells, and is smaller than or equal to:

$$j=n*x, \text{ and } j>=i;$$

where x represents the total number of HSDPA multiflow transmission serving cells configured for the terminal, and n represents an integer smaller than or equal to 1.

202: Generate resource allocation information according to the resource instruction information, where the resource allocation information includes the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode.

Corresponding to the two cases of sending the resource instruction information in step 102 described in the foregoing, in this embodiment, corresponding to the first case, the resource instruction information includes the maximum number of HS-SCCH channels allocated for the terminal in the serving cell corresponding to the base station, where the maximum number of HS-SCCH channels allocated in the serving cell corresponding to the base station is smaller than or equal to i, and a sum of the maximum numbers of HS-SCCH channels allocated for the terminal in all serving cells is smaller than or equal to j. The number of HS-SCCH channels actually allocated by the base station in the serving cell is smaller than the maximum number of HS-SCCH channels allocated in the serving cell corresponding to the base station, that is, the number of HS-SCCH channels allocated by the base station for the terminal in the serving cell corresponding to the base station in the resource allocation information is smaller than or equal to the maximum number of HS-SCCH channels allocated in the serving cell corresponding to the base station.

Corresponding to the second case, that is, when the local is a first base station to which the radio network controller sends resource instruction information, the resource instruction information does not include the maximum number of HS-SCCH channels allocated for the terminal in the serving cell corresponding to the base station, and the number of HS-SCCH channels allocated for the terminal in the serving cell corresponding to the base station in the resource allocation information is smaller than or equal to i.

203: Send the resource allocation information to the radio network controller. In this way, the radio network controller may interact with the terminal according to the resource allocation information, so as to complete resource configuration.

It can be known from the foregoing description that, at a network side, an related base station is notified according to capability information of the maximum number of a monitored HS-SCCH of a terminal configured in an HSDPA multiflow transmission mode, where the capability information is reported by the terminal or defined in a protocol, it is ensured that the number of HS-SCCH channels allocated by the base station for the terminal is within a processing capability range of the terminal, and then the network side performs resource configuration on the terminal according to the number of HS-SCCH channels allocated by the base station, so that it may be ensured that the total number of HS-SCCH channels allocated for the terminal does not exceed a processing capability of the terminal, thereby avoiding waste of HS-SCCH resource allocation and a resulting problem of loss of downlink data transmission.

The following describes the foregoing resource allocation method in further detail through more embodiments. In this embodiment, it is assumed that the number of MF-Tx serving cells of a UE is x, the UE maximally receives i HS-SCCHs in each serving cell, and the UE maximally receives j HS-SCCHs in all serving cells.

Figure 5:
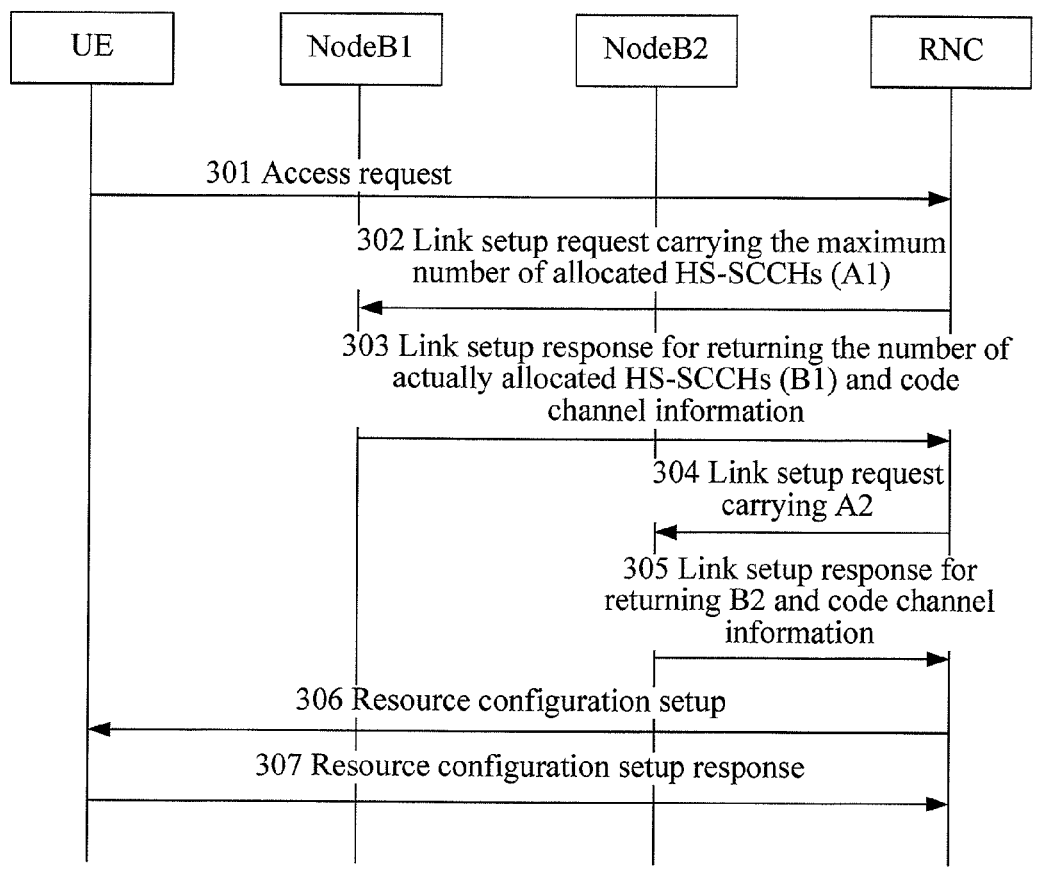
FIG. 5 is a schematic diagram of a resource configuration procedure in a case that corresponding resource instruction information is sent to each of multiple base stations without a time sequence limitation.

FIG. 5 shows a resource configuration procedure in a case that a corresponding radio link setup request is sent to each of multiple base stations without a time sequence limitation. For an MF-Tx serving cell case, reference may be made to the example shown in FIG. 1, resource configuration instruction information and resource configuration allocation information are carried in a radio link setup request and a link setup response, respectively, and the procedure includes the following steps.

301: A UE initiates an access request, and after receiving the access request, an RNC decides to establish MF-Tx for the UE, and determines that base stations which serving cells belong to are a base station 1 and a base station 2.

302: The RNC sends a radio link setup request to the base station 1, where the radio link setup request carries A1, A1 is the maximum number of HS-SCCH channels allocated in a serving cell of the base station 1, and A1<=i.

303: The base station 1 returns a link setup response including allocated HS-SCCH resource information, where the corresponding number of HS-SCCH channels is B1, and B1<=A1.

304: The RNC sends a radio link setup request to the base station 2, where the radio link setup request carries A2, A2 is the maximum number of HS-SCCH channels allocated in a serving cell of the base station 2, and A2<=i.

305: The base station 2 returns a link setup response including allocated HS-SCCH resource information, where the corresponding number of HS-SCCH channels is B2, and B2<=A2.

Meanwhile, the RNC further determines that A1+A2<=j when determining A1 and A2. Definitely, a step that the RNC determines A1 and A2 needs to be performed before or at the same time with steps 302 and 304, and there is no necessary time sequence between steps 302 and 303 and steps 304 and 305, which may be performed at the same time or one after another.

306: After obtaining the responses returned by the base station 1 and the base station 2, the RNC carries the HS-SCCH resource information that is allocated by the base stations and carried in the responses in resource configuration information and sends the resource configuration information to the UE, where the HS-SCCH resource information includes HS-SCCH code channel information.

307: The UE returns a resource configuration response to complete resource configuration, and in this case, the UE monitors B1 HS-SCCHs in cell1, and monitors B2 HS-SCCHs in cell2. B1 and B2 are both smaller than or equal to the foregoing rule.

Figure 6:
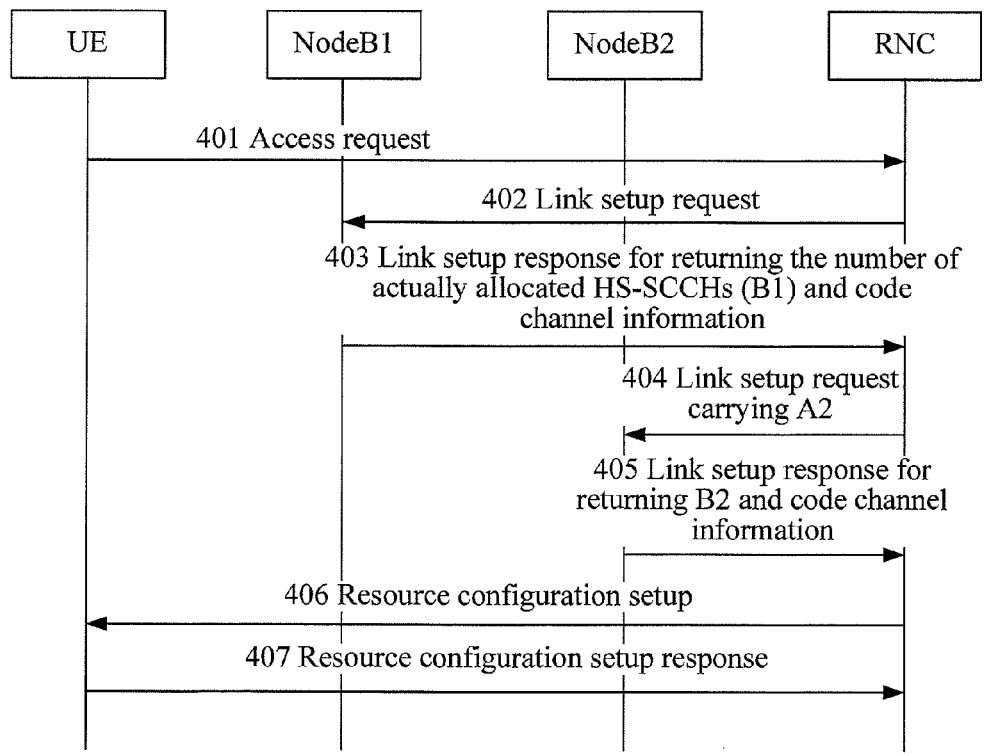
FIG. 6 is a schematic diagram of a resource configuration procedure in a case that corresponding resource instruction information is sent to each of multiple base stations successively.

Correspondingly, FIG. 6 shows a resource configuration procedure in a case that a corresponding radio link setup request is sent to each of multiple base stations successively. For an MF-Tx serving cell case, reference may be made to the example shown in FIG. 1, and the procedure includes the following steps.

401: A UE initiates an access request, and an RNC decides, according to the access request, to establish MF-Tx for the UE, where base stations which serving cells belong to are a base station 1 and a base station 2.

402: The RNC sends a radio link setup request to the base station 1, which implicitly includes resource instruction information, so as to instruct the base station 1 to allocate an HS-SCCH for the terminal in a serving cell corresponding to the base station 1.

403: The base station 1 returns a link setup response including allocated HS-SCCH resource information, where the corresponding number of HS-SCCH channels is B1, and B1<=1.

404: The RNC sends a radio link setup request to the base station 2, the radio link setup request carries A2, A2 is the maximum number of HS-SCCH channels allocated in a serving cell of the base station 2, A2<i, and A2<=j−B1.

405: The base station 2 returns a link setup response including allocated HS-SCCH resource information, where the corresponding number of HS-SCCH channels is B2, and B2<=A2.

406: The RNC carries the allocated HS-SCCH resource information in resource configuration information and sends the resource configuration information to the UE, where the HS-SCCH resource information includes an HS-SCCH scrambling code and/or HS-SCCH code channel information, and the code channel information specifically refers to a channelization code.

407: The UE returns a resource configuration response, and in this case, the UE monitors B1 HS-SCCHs in cell1, and monitors B2 HS-SCCHs in cell2. B1 and B2 are both smaller than or equal to the foregoing rule.

A difference from the case shown in FIG. 5 lies in that, the RNC does not need to send an instruction of the maximum number of allocated HS-SCCHs to all serving base stations. Generally speaking, the embodiment described in FIG. 5 is suitable for use when MF-Tx serving cells are established at the same time, but the embodiment described in FIG. 6 is suitable for use when MF-Tx serving cells are established one after another.

Scenarios shown in FIG. 5 and FIG. 6 are scenarios where serving cells of the UE are two single-frequency point cells. According to the foregoing description, MF-Tx further includes many modes, for example, the case shown in FIG. 2. As shown in Table 1, Cell x-y is used to identify a certain serving cell of a certain frequency point, x is used to represent a frequency of a cell, y is used to represent a number of a cell on a same frequency, and it should be noted that cells listed in the table are a combination of MF-Tx serving cells. For example, MF-Tx serving cells of a UE may be Cell 1-1, Cell 1-2, Cell 2-1, and Cell 2-2, and may also be another combination.

TABLE 1

| Frequency point | Cell | | | |
|---|---|---|---|---|
| M1 | Cell 1-1 | Cell 1-2 | Cell 1-3 | ... |
| M2 | Cell 2-1 | Cell 2-2 | Cell 2-3 | ... |
| M3 | Cell 3-1 | Cell 3-2 | Cell 3-3 | ... |
| ... | ... | ... | ... | ... |

When serving cells, of the UE are on different base stations, it is assumed that base stations where HSDPA multiflow transmission serving cells are located are a base station 1, a base station 2, a base station 3, . . . , and a base station n; the numbers of HSDPA multiflow transmission serving cells which belong to corresponding base stations are n1, n2, n3, . . . , and nn; and the total number of serving cells is x, and x=n1+n2+n3+ . . . +nn. A corresponding HS-SCCH resource allocation rule is that it is assumed that the number of MF-Tx serving cells of a UE is x, the UE maximally receives i HS-SCCHs in each serving cell, and the UE maximally receives j HS-SCCHs in all serving cells, for example, i=4, and j=3*x.

In this case, in the embodiment shown in FIG. 5, it only needs to correspondingly adjust the set maximum number of allocated HS-SCCH channels of each base station 1, that is, B1+B2+B3 . . . <=A1+A2+A3 . . . <=j, A1<=i, A2<=i, A3<=i, . . . . Definitely, multiple serving cells which belong to a same base station may exist, and therefore a radio link setup request sent to the base station carries Ai values corresponding to the multiple serving cells. Adjustment in the embodiment shown in FIG. 6 is similar, and an Ai value does not need to be sent to a first base station.

In the foregoing embodiment, according to the maximum number of HS-SCCH channels carried in capability information of the maximum number of a monitored HS-SCCH of a terminal configured in an HSDPA multiflow transmission mode, where the capability information is reported by the terminal or defined in a protocol, an RNC requests a base station to allocate HS-SCCH resource information, so that during configuration of MF-Tx, a network side ensures that an allocated HS-SCCH is within a processing capability of a UE, thereby avoiding a problem of inconsistency of HS-SCCH configuration information between the UE and the network side.

Corresponding to the foregoing method embodiment, an embodiment of the present invention further provides a radio network system, which includes a radio network controller 10 and a base station 20.

The radio network controller 10 is configured to generate resource instruction information according to capability information of the maximum number of a monitored HS-SCCH of a terminal configured in an HSDPA multiflow transmission mode; send the resource instruction information to the base station; and receive resource allocation information that is returned by the base station according to the resource instruction information, where the resource allocation information includes the number of HS-SCCH channels allocated by the base station for the terminal in a serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode.

The base station 20 is configured to receive the resource instruction information sent by the radio network controller; generate resource allocation information according to the resource instruction information; and send the resource allocation information to the radio network controller.

Figure 7:
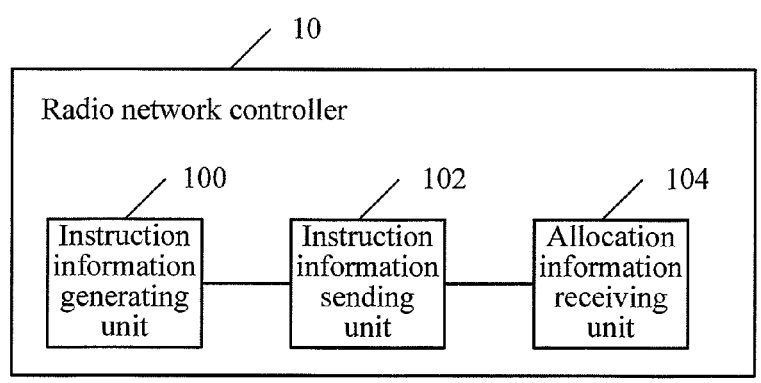
FIG. 7 is a specific composition schematic diagram of a radio network controller according to an embodiment of the present invention.

As shown in FIG. 7, specifically, the radio network controller 10 may include: an instruction information generating unit 100, configured to generate the resource instruction information according to the capability information of the maximum number of a monitored HS-SCCH of the terminal configured in the HSDPA multiflow transmission mode, where the resource instruction information is used to instruct the base station to allocate an HS-SCCH for the terminal in the serving cell corresponding to the base station; an instruction information sending unit 102, configured to send the resource instruction information to the base station; and an allocation information receiving unit 104, configured to receive the resource allocation information that is returned by the base station according to the resource instruction information, where the resource allocation information includes the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode.

It should be noted that, any number of units of the foregoing radio network controller may be integrated in a processor (processor), or may each be a processor (processer).

The capability information of the maximum number of a monitored HS-SCCH of the terminal configured in the HSDPA multiflow transmission mode includes that the terminal maximally receives i HS-SCCHs in each serving cell and the terminal maximally receives j HS-SCCHs in all serving cells, and is smaller than or equal to:

$j=n*x$, and $j>=i$;

where x is the total number of serving cells of the terminal configured in the HSDPA multiflow transmission mode, j and i are both integers greater than or equal to 1, and n represents an integer greater than or equal to 1.

The instruction information sending unit 102 is further configured to send the resource instruction information to the base station. The resource instruction information includes the maximum number of HS-SCCH channels allocated for the terminal in the serving cell corresponding to the base station, the maximum number of HS-SCCH channels allocated in the serving cell corresponding to the base station is smaller than or equal to i, and a sum of the maximum numbers of HS-SCCH channels allocated for the terminal in all serving cells is smaller than or equal to j.

In another embodiment of the present invention, the instruction information sending unit 102 is further configured to send resource instruction information to a first base station; the allocation information receiving unit 104 is further configured to obtain resource allocation information returned by the first base station, where the maximum number of HS-SCCH channels allocated in a serving cell corresponding to the first base station in the resource allocation information returned by the first base station is smaller than or equal to i; and the instruction information generating unit 100 is further configured to determine, according to the resource allocation information returned by the first base station and the capability information of the maximum number of a monitored HS-SCCH of the terminal configured in the HSDPA multiflow transmission mode, resource instruction information sent to a second base station, where the maximum number of HS-SCCH channels allocated for the terminal in a serving cell corresponding to the second base station in the resource instruction information sent to the second base station is smaller than or equal to i, and a sum of the maximum numbers of allocated HS-SCCH channels corresponding to the terminal in all serving cells is smaller than or equal to j.

Figure 8:
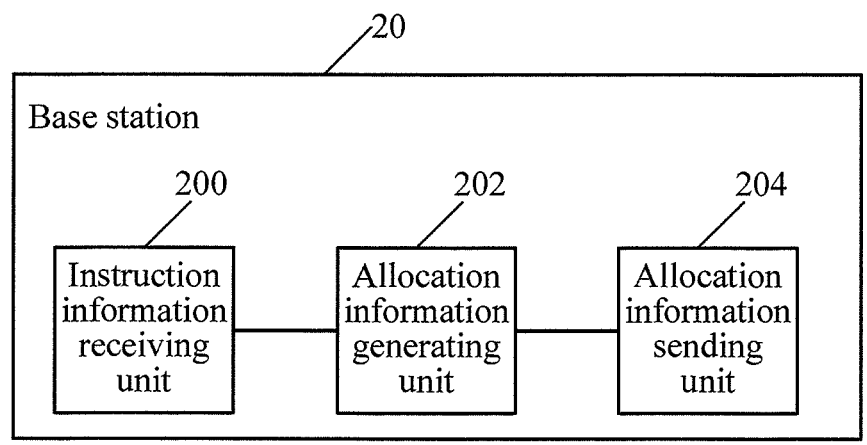
FIG. 8 is a specific composition schematic diagram of a base station according to an embodiment of the present invention.

Meanwhile, an embodiment of the present invention further provides a base station, for example, a base station. As shown in FIG. 8, the base station 20 includes: an instruction information receiving unit 200, configured to receive resource instruction information sent by a radio network controller, where the resource capability instruction information is information generated by the radio network controller according to capability information of the maximum number of a monitored HS-SCCH of a terminal configured in an HSDPA multiflow transmission mode and is used to instruct the base station to allocate an HS-SCCH for the terminal in a serving cell corresponding to the base station; an allocation information generating unit 202, configured to generate resource allocation information according to the resource instruction information, where the resource allocation information includes the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode; and an allocation information sending unit 204, configured to send the resource allocation information to the radio network controller.

It should be noted that, any number of units of the foregoing base station may be integrated in a processor (processer), or may each be a processor (processer).

The capability information of the maximum number of a monitored HS-SCCH of the terminal configured in the HSDPA multiflow transmission mode includes that the terminal maximally receives i HS-SCCHs in each serving cell and the terminal maximally receives j HS-SCCHs in all serving cells, and is smaller than or equal to:

$$j=n*x, \text{ and } j>=i;$$

where x represents the total number of HSDPA multiflow transmission serving cells configured for the terminal, j and i are both integers greater than or equal to 1, and n represents an integer smaller than or equal to 1.

The resource instruction information includes the maximum number of HS-SCCH channels allocated for the terminal in the serving cell corresponding to the base station, the maximum number of HS-SCCH channels allocated in the serving cell corresponding to the base station is smaller than or equal to i, and a sum of the maximum numbers of HS-SCCH channels allocated for the terminal in all serving cells is smaller than or equal to j; and the number of HS-SCCH channels allocated for the terminal in the serving cell corresponding to the base station in the resource allocation information is smaller than or equal to the maximum number of HS-SCCH channels allocated in the serving cell corresponding to the base station.

In another embodiment of the present invention, when the local is a first base station to which the radio network controller sends resource instruction information, the resource instruction information does not include the maximum number of HS-SCCH channels allocated for the terminal in the serving cell corresponding to the base station, and the number of HS-SCCH channels allocated for the terminal in the serving cell corresponding to the base station in the resource allocation information is smaller than or equal to i.

Figure 9:
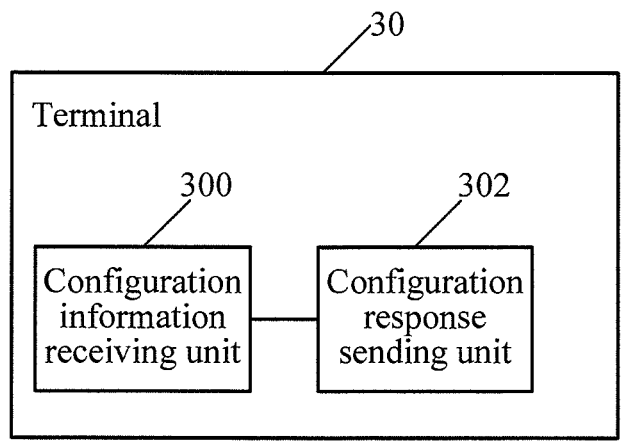
FIG. 9 is a specific composition schematic diagram of a terminal according to an embodiment of the present invention.

As shown in FIG. 9, an embodiment of the present invention further provides a terminal 30, which includes:

a configuration information receiving unit 300, configured to receive resource configuration information sent by a radio network controller, where the resource configuration information is resource configuration information generated according to resource allocation information after receiving the resource allocation information returned by a base station after the radio network controller generates resource instruction information according to capability information of the maximum number of a monitored HS-SCCH of the terminal configured in an HSDPA multiflow transmission mode and sends the resource instruction information to the base station, the resource allocation information includes the number of HS-SCCH channels allocated by the base station for the terminal in a serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode; and a configuration response sending unit 302, configured to perform configuration according to the received resource configuration information and return resource configuration response information to the radio network controller, so as to complete resource configuration.

It should be noted that, the terms and technical details in the foregoing system and apparatus embodiments are consistent with those in the foregoing method embodiments, which are not described herein again.

In the embodiment of the present invention, a radio network controller notifies a base station according to terminal capability information reported by a terminal, and ensures that the number of HS-SCCH channels allocated by the base station for the terminal is within a processing capability range of the terminal; then, the radio network controller performs resource configuration on the terminal according to the number of HS-SCCH channels allocated by the base station, which may ensure that the total number of HS-SCCH channels allocated for the terminal does not exceed a processing capability of the terminal, thereby avoiding waste of HS-SCCH resource allocation and a resulting problem of loss of downlink data transmission.

It may be clearly understood by a person skilled in the art that, for convenience and ease of description, only division of the foregoing functional modules is taken as an example for description, but in an actual application, the foregoing functions may be assigned to different functional modules according to a need to implement, that is, an internal structure of an apparatus is divided into different functional modules to implement all or a part of the functions described in the foregoing. For specific working processes of the foregoing system, apparatus, and unit, reference may be made to corresponding processes in the method embodiments, which are not described herein again.

In several embodiments provided in the present application, it should be understood that the disclosed system, apparatus, and method may be implemented in other ways. For example, the described apparatus embodiments are only exemplary. For example, the division of module or unit is only logical function division and may be other division in actual implementation. For example, multiple units or components may be combined or integrated into another system, or some features may be ignored or not performed. In addition, the shown or discussed coupling or direct coupling or a communication connection may be accomplished through some interfaces, and indirect coupling or a communication connection between apparatuses or units may be electrical, mechanical, or in other forms.

The units described as separate components may be or may not be physically separated. Components shown as units may be or may not be physical units, that is, may be located in one place or distributed on multiple network units. Some or all of the units may be selected according to an actual need to achieve the objectives of the solutions of the embodiments.

In addition, various functional units in each embodiment of the present invention may be integrated in one processing unit or may exist as various separate physical units, or two or more than two units may be integrated in one unit. The foregoing integrated module may be implemented in the form of hardware, or may be implemented in the form of a software functional unit.

When the integrated unit is implemented in the form of a software functional unit and sold or used as a separate product, the integrated unit may be stored in a computer readable storage medium. Based on such an understanding, the technical solutions of the present invention essentially or the part that makes contributions to the prior art may be embodied in the form of a software product. The computer software product is stored in a storage medium, and includes several instructions used to instruct a computer device (which may be a personal computer, a server, or a network device) or a processor (processor) to perform all or a part of steps of the method described in the embodiments of the present invention. The foregoing storage medium includes various media capable of storing program codes, such as, a USB flash disk, a removable hard disk, a read-only memory (ROM, Read-Only Memory), a random access memory (RAM, Random Access Memory), a magnetic disk, or an optical disk.

The foregoing embodiments are only provided for describing the technical solutions of the present invention, but are not intended to limit the present invention. It should be understood by a person of ordinary skill in the art that although the present invention has been described in detail with reference to the foregoing embodiments, modifications may still be made to the technical solutions described in the foregoing embodiments, or equivalent replacements may be made to some technical features of the technical solutions; however these modifications or replacements do not make the essence of corresponding technical solutions depart from the spirit and scope of the technical solutions in the embodiments of the present invention.

What is claimed is:

1. A resource allocation method, comprising:
   generating resource instruction information according to capability information of the maximum number of a monitored high speed shared control channel (HS-SCCH) of a terminal configured in a high speed downlink packet access (HSDPA) multiflow transmission mode, and sending the resource instruction information to a base station, wherein the resource instruction information is used to instruct the base station to allocate an HS-SCCH for the terminal in a serving cell corresponding to the base station; and
   receiving resource allocation information returned by the base station, wherein the resource allocation information comprises the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode;
   wherein the capability information of the maximum number of a monitored HS-SCCH of the terminal configured in the HSDPA multiflow transmission mode comprises that the terminal maximally receives i HS-SCCHs in each serving cell and the terminal maximally receives j HS-SCCHs in all serving cells, and $j=n*x$, and $j>=i$;
   wherein x is the total number of serving cells of the terminal configured in the HSDPA multiflow transmission mode, j and i are both integers greater than or equal to 1, and n represents an integer greater than or equal to 1.

2. The method according to claim 1, wherein sending the resource instruction information to a base station comprises:
   sending the resource instruction information to the base station, wherein the resource instruction information comprises the maximum number of HS-SCCH channels allocated for the terminal in the serving cell corresponding to the base station, the maximum number of HS-SCCH channels allocated in the serving cell corresponding to the base station is smaller than or equal to i, and a sum of the maximum numbers of HS-SCCH channels allocated for the terminal in all the serving cells is smaller than or equal to j.

3. The method according to claim 1, wherein sending the resource instruction information to a base station comprises:
   sending the resource instruction information to a first base station;
   obtaining resource allocation information returned by the first base station, wherein the maximum number of HS-SCCH channels allocated in a serving cell corresponding to the first base station in the resource allocation information returned by the first base station is smaller than or equal to i; and
   determining, according to the resource allocation information returned by the first base station and the capability information of the maximum number of a monitored HS-SCCH of the terminal configured in the HSDPA multiflow transmission mode, resource instruction information sent to a second base station, wherein the maximum number of HS-SCCH channels allocated for the terminal in a serving cell corresponding to the second base station in the resource instruction information sent to the second base station is smaller than or equal to i, and a sum of the maximum numbers of allocated HS-SCCH channels corresponding to the terminal in all the serving cells is smaller than or equal to j.

4. The method according to claim 1, further comprising:
   receiving an access request message sent by the terminal;
   determining to establish HSDPA multiflow transmission for the terminal according to the access request message, and determining a serving cell to be accessed and a base station corresponding to the serving cell to be accessed; and
   obtaining the capability information of the maximum number of a monitored HS-SCCH of the terminal configured in the HSDPA multiflow transmission mode.

5. A resource allocation method, comprising:
receiving resource instruction information sent by a radio network controller, wherein the resource instruction information is information generated by the radio network controller according to capability information of the maximum number of a monitored high speed shared control channel (HS-SCCH) of a terminal configured in a high speed downlink packet access (HSDPA) multiflow transmission mode and is used to instruct a base station to allocate an HS-SCCH for the terminal in a serving cell corresponding to the base station;
generating resource allocation information according to the resource instruction information, wherein the resource allocation information comprises the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode; and
sending the resource allocation information to the radio network controller;
wherein the capability information of the maximum number of a monitored HS-SCCH of the terminal configured in the HSDPA multiflow transmission mode comprises that the terminal maximally receives i HS-SCCHs in each serving cell and the terminal maximally receives j HS-SCCHs in all serving cells, and $j=n*x$, and $j>=i$;
wherein x represents the total number of HSDPA multiflow transmission serving cells configured for the terminal, j and i are both integers greater than or equal to 1, and n represents an integer greater than or equal to 1.

6. The method according to claim 5, wherein
the resource instruction information comprises the maximum number of HS-SCCH channels allocated for the terminal in the serving cell corresponding to the base station, the maximum number of HS-SCCH channels allocated in the serving cell corresponding to the base station is smaller than or equal to i, and a sum of the maximum numbers of HS-SCCH channels allocated for the terminal in all the serving cells is smaller than or equal to j; and
the number of HS-SCCH channels allocated by the base station for the terminal in the serving cell corresponding to the base station in the resource allocation information is smaller than or equal to the maximum number of HS-SCCH channels allocated in the serving cell corresponding to the base station.

7. The method according to claim 5, wherein
when the local is a first base station to which the radio network controller sends resource instruction information, the resource instruction information does not comprise the maximum number of HS-SCCH channels allocated for the terminal in the serving cell corresponding to the base station, and the number of HS-SCCH channels allocated for the terminal in the serving cell corresponding to the base station in the resource allocation information is smaller than or equal to i.

8. A radio network controller, comprising:
a processor; and
memory coupled to the processor, the memory comprising instructions that, when executed by the processor, cause the radio network controller to:

generate resource instruction information according to capability information of the maximum number of a monitored high speed shared control channel (HS-SCCH) of a terminal configured in a high speed downlink packet access (HSDPA) multiflow transmission mode, wherein the resource instruction information is used to instruct a base station to allocate an HS-SCCH for the terminal in a serving cell corresponding to the base station;
send the resource instruction information to the base station; and
receive resource allocation information that is returned by the base station according to the resource instruction information, wherein the resource allocation information comprises the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode;
wherein the capability information of the maximum number of a monitored HS-SCCH of the terminal configured in the HSDPA multiflow transmission mode comprises that the terminal maximally receives i HS-SCCHs in each serving cell and the terminal maximally receives j HS-SCCHs in all serving cells, and $j=n*x$, and $j>=i$;
wherein x is the total number of serving cells of the terminal configured in the HSDPA multiflow transmission mode, j and i are both integers greater than or equal to 1, and n represents an integer greater than or equal to 1.

9. The radio network controller according to claim 8, wherein the memory further comprises instructions that, when executed by the processor, cause the radio network controller to send the resource instruction information to the base station, wherein the resource instruction information comprises the maximum number of HS-SCCH channels allocated for the terminal in the serving cell corresponding to the base station, the maximum number of HS-SCCH channels allocated in the serving cell corresponding to the base station is smaller than or equal to i, and a sum of the maximum numbers of HS-SCCH channels allocated for the terminal in all the serving cells is smaller than or equal to j.

10. The radio network controller according to claim 8, wherein the memory further comprises instructions that, when executed by the processor, cause the radio network controller to:
send the resource instruction information to a first base station;
obtain resource allocation information returned by the first base station, wherein the maximum number of HS-SCCH channels allocated in a serving cell corresponding to the first base station in the resource allocation information returned by the first base station is smaller than or equal to i; and
determine, according to the resource allocation information returned by the first base station and the capability information of the maximum number of a monitored HS-SCCH of the terminal configured in the HSDPA multiflow transmission mode, resource instruction information sent to a second base station, wherein the maximum number of HS-SCCH channels allocated for the terminal in a serving cell corresponding to the second base station in the resource instruction information sent to the second base station is smaller than or equal to i, and a sum of the maximum numbers of allocated HS-SCCH channels corresponding to the terminal in all the serving cells is smaller than or equal to j.

11. A base station, comprising:

a processor; and memory coupled to the processor, the memory comprising instructions that, when executed by the processor, cause the base station to:

receive resource instruction information sent by a radio network controller, wherein the resource instruction information is information generated by the radio network controller according to capability information of the maximum number of a monitored high speed shared control channel (HS-SCCH) of a terminal configured in a high speed downlink packet access (HSDPA) multiflow transmission mode and is used to instruct the base station to allocate an HS-SCCH for the terminal in a serving cell corresponding to the base station;

generate resource allocation information according to the resource instruction information, wherein the resource allocation information comprises the number of HS-SCCH channels allocated by the base station for the terminal in the serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode; and send the resource allocation information to the radio network controller;

wherein the capability information of the maximum number of a monitored HS-SCCH of the terminal configured in the HSDPA multiflow transmission mode comprises that the terminal maximally receives i HS-SCCHs in each serving cell and the terminal maximally receives j HS-SCCHs in all serving cells, and j=n*x, and j>=i;

wherein x represents the total number of HSDPA multiflow transmission serving cells configured for the terminal, j and i are both integers greater than or equal to 1, and n represents an integer greater than or equal to 1.

12. The base station according to claim 11, wherein the resource instruction information comprises the maximum number of HS-SCCH channels allocated for the terminal in the serving cell corresponding to the base station, the maximum number of HS-SCCH channels allocated in the serving cell corresponding to the base station is smaller than or equal to i, and a sum of the maximum numbers of HS-SCCH channels allocated for the terminal in all the serving cells is smaller than or equal to j; and the number of HS-SCCH channels allocated for the terminal in the serving cell corresponding to the base station in the resource allocation information is smaller than or equal to the maximum number of HS-SCCH channels allocated in the serving cell corresponding to the base station.

13. The base station according to claim 11, wherein when the local is a first base station to which the radio network controller sends resource instruction information, the resource instruction information does not comprise the maximum number of HS-SCCH channels allocated for the terminal in the serving cell corresponding to the base station, and the number of HS-SCCH channels allocated for the terminal in the serving cell corresponding to the base station in the resource allocation information is smaller than or equal to i.

14. A terminal, comprising:

a processor; and memory coupled to the processor, the memory comprising instructions that, when executed by the processor, cause the terminal to:

receive resource configuration information sent by a radio network controller, wherein the resource configuration information is resource configuration information generated according to resource allocation information after receiving the resource allocation information returned by a base station after the radio network controller generates resource instruction information according to capability information of the maximum number of a monitored high speed shared control channel (HS-SCCH) of the terminal configured in a high speed downlink packet access (HSDPA) multiflow transmission mode and sends the resource instruction information to the base station, the resource allocation information comprises the number of HS-SCCH channels allocated by the base station for the terminal in a serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode; and perform configuration according to the received resource configuration information and return resource configuration response information to the radio network controller, so as to complete resource configuration;

wherein the capability information of the maximum number of a monitored HS-SCCH of the terminal configured in the HSDPA multiflow transmission mode comprises that the terminal maximally receives i HS-SCCHs in each serving cell and the terminal maximally receives j HS-SCCHs in all serving cells, and j=n*x, and j>=i;

wherein x represents the total number of HSDPA multiflow transmission serving cells configured for the terminal, j and i are both integers greater than or equal to 1, and n represents an integer greater than or equal to 1.

15. A radio network system, comprising a radio network controller and a base station, wherein the radio network controller is configured to generate resource instruction information according to capability information of the maximum number of a monitored high speed shared control channel (HS-SCCH) of a terminal configured in a high speed downlink packet access (HSDPA) multiflow transmission mode; send the resource instruction information to the base station; and receive resource allocation information that is returned by the base station according to the resource instruction information, wherein the resource allocation information comprises the number of HS-SCCH channels allocated by the base station for the terminal in a serving cell corresponding to the base station, and the number of HS-SCCH channels allocated for the terminal in the serving cell corresponding to the base station is smaller than or equal to the maximum number of a monitored HS-SCCH of the terminal configured in the HSDPA multiflow transmission mode; and the base station is configured to receive the resource instruction information sent by the radio network controller; generate the resource allocation information according to the resource instruction information; and send the resource allocation information to the radio network controller;

wherein the capability information of the maximum number of a monitored HS-SCCH of the terminal configured in the HSDPA multiflow transmission mode comprises that the terminal maximally receives i HS-SCCHs in each serving cell and the terminal maximally receives j HS-SCCHs in all serving cells, and j=n*x, and j>=i;

wherein x represents the total number of HSDPA multiflow transmission serving cells configured for the terminal, j and i are both integers greater than or equal to 1, and n represents an integer greater than or equal to 1.

* * * * *